United States Patent [19]

Kohira et al.

[11] Patent Number: 5,457,545
[45] Date of Patent: Oct. 10, 1995

[54] FACSIMILE APPARATUS AND IMAGE SIGNAL DISPLAY METHOD AND IMAGE SIGNAL RECORDING METHOD

[75] Inventors: Hidekazu Kohira; Shunichi Oohara, both of Ibaraki; Michihiro Watanabe, Tsuchiura; Tatsuya Nagata, Ishioka; Kazuytaka Sato, Kashiwa; Shogo Matsumoto, Ibaraki, all of Japan

[73] Assignee: Hitachi, Ltd., Tokyo, Japan

[21] Appl. No.: 881

[22] Filed: Jan. 5, 1993

[30] Foreign Application Priority Data

Jan. 14, 1992 [JP] Japan ............................ 4-004488

[51] Int. Cl.⁶ ................................................ H04N 1/46
[52] U.S. Cl. ........................ 358/406; 358/400; 358/471
[58] Field of Search ............................ 358/400, 401, 358/471, 406; 355/266, 267, 271

[56] References Cited

U.S. PATENT DOCUMENTS

| | | | |
|---|---|---|---|
| 4,174,175 | 11/1979 | Di Maria | 355/44 |
| 4,449,147 | 5/1984 | Ogasawara | 358/212 |
| 4,876,609 | 10/1989 | Ogura | 358/443 |
| 4,994,926 | 2/1991 | Gordon | 358/400 |
| 5,032,873 | 7/1991 | Nishikawa | 355/271 |

FOREIGN PATENT DOCUMENTS 3318583 12/1988 Japan.

*Primary Examiner*—Sandra L. O'Shea
*Assistant Examiner*—John Ning
*Attorney, Agent, or Firm*—Antonelli, Terry, Stout & Kraus

[57] ABSTRACT

An object of the present invention is to provide a facsimile apparatus having a high resolution image display unit and a hard copying unit, which is capable of preventing wasteful consumption of recording paper sheets while revealing a reduced size and excellent operation facility. In order to achieve the aforesaid object, according to the present invention, there is provided a facsimile apparatus having the image display unit comprising a reflecting mirror for displaying a toner image formed on an image recording medium in response to an image signal while inverting the toner image into a readable direction and a cover, a selection unit for determining whether or not it is necessary to transfer and fix the toner image onto the recording paper sheet in accordance with whether or not it is necessary to record image information discriminated from the toner image displayed on said image display unit, and the hard copying unit for transferring fixing the toner image formed on the image recording medium by a transferring roller and a drive roller in response to a selection signal supplied from the selection unit.

3 Claims, 4 Drawing Sheets

FACSIMILE APPARATUS AND IMAGE SIGNAL DISPLAY METHOD AND IMAGE SIGNAL RECORDING METHOD

BACKGROUND OF THE INVENTION

1. Field of the Invention

The present invention relates to a facsimile apparatus, and more particularly to a facsimile apparatus having both image display function and hard copying function.

2. Related Art Statement

Hitherto, conventional facsimile apparatuses have had no visual image-display function thereby causing a problem to arise, such as in the case where an unnecessary document is supplied thereto and the unnecessary document is output and therefore the recording paper sheets are wasted.

In order to prevent the aforesaid waste of recording paper sheets, an image signal processing apparatus having a visual image-display function and a hard copying function has been disclosed in Japanese Patent Unexamined Publication No. 2-231868. The aforesaid apparatus comprises a memory for storing a facsimile-received image signal, a signal processing circuit for displaying the stored memory data on an electronic display unit thereof, another signal processing circuit for causing a recording unit to record the image signal, and a selection circuit for arbitrarily changing over the aforesaid units which receive the output therefrom.

Furthermore, an image forming apparatus has been disclosed in Japanese Patent Unexamined Publication No. 63-318583. That image forming apparatus has a recording medium for displaying memory data while forming memory data into a positive image, and further has an intermediate recording medium for inverting the aforesaid image recorded on the recording medium in order to transfer and fix it on the recording paper sheet, wherein a toner image formed on the intermediate recording medium is transferred onto a visible display medium or a plurality of recording mediums, which are recording mediums adapted to a printing operation. The term "toner image" used hereinbefore indicates an image formed by causing an image forming agent (hereinafter called "toner") to electrostatically adhere to the medium.

However, the conventional facsimile apparatuses, each of which displays image information by using electronic display means, encounter a problem that the structure of the apparatus and the scanning procedure become too complicated, causing a failure and an operation error to take place because the apparatuses are provided with further advanced functions.

The image forming apparatus for transferring a toner image formed on the intermediate recording medium onto either of the visible display medium or a plurality of the recording mediums, which are recording mediums adapted to the printing operation, necessitates performing an intermediate process for inverting the positive toner image formed on the displaying recording medium so as to form it on the intermediate recording medium. Therefore, problems arise in that the quality of the toner image formed on the recording medium deteriorates and the height of the apparatus cannot be shortened as compared with the structure in which the toner image on the image recording medium is directly transferred on to the recording paper sheet. What is worse, the structure, in which toner is supplied to the leading portion of the recording electrode by using a rotary magnet, requires synchronized timing of the movement of the image recording medium and that of the application of the recording voltage to the recording electrode with each other, making it difficult to form a toner image having high resolution on the image recording medium.

SUMMARY OF THE INVENTION

Accordingly, an object of the present invention is to provide a facsimile apparatus having a high resolution hard copying function and an image display function structured simply, a toner image copying method and a toner image display method each of which is adaptable to the aforesaid facsimile apparatus.

In order to achieve the aforesaid object, according to the present invention, there is a facsimile apparatus having: an image recording medium for forming a toner image which corresponds to an image signal in original-document image information to be transmitted or received original-document image information, and hard copying means for transferring and fixing the toner image formed on the image recording medium on to a recording paper sheet. It is preferable that the aforesaid facsimile apparatus further comprises image display means for reading the toner image formed on the image recording medium and selection means for selecting whether or not it is necessary to transfer and affix the toner image onto the recording paper sheet according to whether or not it is necessary to record image information discriminated from the toner image displayed on the image display means.

In order to achieve the aforesaid object, according to the present invention, there is facsimile apparatus comprising: storage means for storing original-document image information to be transmitted or received original-document image information; an image recording medium for forming a toner image which corresponds to an image signal in image information stored in the storage means; and hard copying means for transferring and fixing the toner image formed on the image recording medium onto a recording paper sheet. The facsimile apparatus further comprises: image signal inversion means for inverting the image signal stored in the image information storage means to cause the toner image to be formed on the image recording medium to be oriented in a direction inverted from the readable direction; image display means for reading the toner image formed on the image recording medium from the image signal inverted by the image signal inversion means; and selection means for determining whether or not it is necessary to transfer and affix the toner image onto the recording paper sheet in accordance with whether or not it is necessary to record image information discriminated from the toner image displayed on the image display means.

In the facsimile apparatus according to the present invention, the image display means has a mirror surface, and a portion or the entire surface of the mirror surface is formed into a convex surface.

In the facsimile apparatus according to the present invention, the image display means is rotatively fixed to the surface of the facsimile apparatus at an end portion thereof so as to display the toner image formed on the image recording medium in such a manner that the toner image can be read.

In order to achieve the aforesaid object, according to the present invention, there is suggested a facsimile apparatus comprising: an original-document reading portion for reading original-document image information or received original-document image information; an image recording medium for forming a toner image which corresponds to an image signal in the original-document reading portion; and hard copying means for transferring and fixing the toner image formed on the image recording medium onto a recording paper sheet, wherein the image recording medium is formed into a plate-like shape on which toner images can be formed on the two sides thereof, and a plurality of development units are disposed on the two sides of the image recording medium so as to form the toner images on the two sides of the plate-like image recording medium in such a manner that a normal image is formed on either side of the plate-like image recording medium, and an inverted toner image, which is mirror-symmetrical to the normal toner image, is formed on the residual side.

In the facsimile apparatus according to the present invention, on either side of the plate-like image recording medium is formed image display means for displaying the toner image formed in response to the image signal, and selection means is provided which determines whether or not it is a necessary to transfer affix the toner image onto the recording paper sheet, in accordance with whether or not it is necessary to record image information discriminated from the toner image displayed on the image display means, and a plurality of the development units are able to move on the two sides of the plate-like image recording medium.

The facsimile apparatus has selection means for determining whether or not it is necessary to transfer and affix the toner image onto the recording paper sheet in accordance with whether or not it is necessary to record image information discriminated from the toner image displayed on the image display means, and the hard copying means for transferring and fixing the toner image formed on the plate-like image recording medium to the recording paper sheet has a roller having a heat source or a metal plate having a heat source, the hard copying means being enabled to translate between a first position at which it comes in contact with either side of the image recording medium and a second position at which it does not come in contact with the side.

The image recording medium of each of the aforesaid facsimile apparatuses is formed into an endless-belt-like shape or a plate-like shape formed by applying a dielectric material, which is a dielectric polymer material, to the surface of a metal member.

In order to achieve the aforesaid object, each of the aforesaid facsimile apparatuses according to the present invention has the image display means and the hard copying means, each of which is formed into a unit so that the size is reduced and the operation facility is improved.

In order to achieve the aforesaid object, according to the present invention, there is a method of displaying an image signal adaptable to a facsimile apparatus and arranged to form a toner image which corresponds to image signal in original-document image information to be transmitted or received original-document image information so as to display the toner image. The method of displaying an image signal adaptable to a facsimile apparatus comprises the steps of: forming the toner image while inverting its display direction into a readable direction; and displaying the toner image while inverting the display direction of the toner image into a direction in which the toner image can be read on an image display means.

In order to achieve the aforesaid object, according to the present invention, there is a method of displaying an image signal adaptable to a facsimile apparatus arranged in such a manner that original-document image information to be transmitted or received original-document image information is stored in image information storage means, and a toner image, which corresponds to an image signal in image information stored in the image information storage means, is formed on an image recording medium so as to display the toner image. The method of displaying an image signal adaptable to a facsimile apparatus comprises the steps of: transferring image information stored in the storage means to a line buffer by a quantity corresponding to one line; synchronizing, in a bidirectional shift register, parallel data for a line transferred to the line buffer with a clock signal so as to take it out as serial data; and switching, in a bidirectional shift register, the shifting direction of parallel data for one line, so that image information is displayed on the image recording medium in such a manner that the display direction is switched.

In order to achieve the aforesaid object, according to the present invention, there is suggested a method of recoding an image signal adaptable to a facsimile apparatus and arranged in such a manner that original-document image information to be transmitted or received original-document image information is stored in image information storage means, and a toner image formed on an image recording medium while corresponding to an image signal in image information stored in the image information storage means is recorded to a recording paper sheet. The method of recording an image signal adaptable to a facsimile apparatus still further comprises the steps of: forming the toner image on the image recording medium while inverting the display direction into a readable direction; transferring and fixing the toner image onto a recording paper sheet after the toner image has been displayed while being inverted into a readable display direction by image display means; and recording the toner image in a readable display direction.

In order to achieve the aforesaid object, according to the present invention, there is a method of recording an image signal adaptable to a facsimile apparatus and arranged in such a manner that original-document image information to be transmitted or received original-document image information is stored in image information storage means, and a toner image formed on an image recording medium while corresponding to an image signal in image information stored in the image information storage means is recorded to a recording paper sheet. The method of recording an image signal adaptable to a facsimile apparatus comprises the steps of: forming the toner image on either side of a plate-like image recording medium, on the two sides of which toner images can be formed, while inverting the toner image into a readable direction; and abutting transferring and fixing means against the image recording medium in response to a recording signal supplied from selection means so as to transfer and fix the toner image to a recording paper sheet.

In the image signal recording method, the means for transferring and fixing the toner image formed on either side of the plate-like image recording medium, on the two sides of which the toner images can be formed, to the recording paper sheet comprises a roller or a metal plate having a heat source, and the roller or the metal plate is heated and abutted against the toner image, so that the toner image is transferred and fixed to the recording paper sheet.

In order to achieve the aforesaid object, according to the present invention, there is a facsimile apparatus including: an image recording medium arranged to form a toner image which corresponds to an image signal in original-document image information to be transmitted or received original-document image information and having a dielectric layer formed on a conductive substrate; a recording electrode disposed while having a small gap from the image recording medium and arranged to form the toner image on the image recording medium in response to an image signal; and a non-magnetic cylindrical member disposed in the upper stream in the direction in which the image recording medium moves with respect to the recording electrode and arranged to supply toner to the recording electrode. The facsimile apparatus further comprises: a stationary magnet arranged to supply a magnetic flux to the leading portion of the recording electrode and disposed in the lower stream in the direction in which the image recording medium moves with respect to the recording electrode and another stationary magnet disposed in the non-magnetic cylindrical member arranged to supply a magnetic flux to the leading portion of the recording electrode.

Since the aforesaid means and methods are employed, a toner image formed on the recording medium while being inverted from the readable direction can be inverted so as to read image information from the image display means, the structure of which can be simplified in such a manner that complicated processes and operations using an electronic display apparatus can be eliminated.

In addition, a high resolution and clear image can be recorded because the toner image formed on the image recording medium can be directly transferred and fixed to the recording paper sheet without using an intermediate recording medium to make a hard copy.

By forming a convex surface in the mirror portion of the image display means, the toner image formed on the image recording medium can be enlarged when it is displayed, so that image information can be easily confirmed.

When the toner image, which is formed on either side of the image recording medium, and from which a hard copy is made, is recorded if necessary, the toner image is transferred and fixed by using the heating means in such a manner that the recording paper sheet is abutted against the toner image and the recording paper sheet is not moved. Therefore, a high resolution image can be obtained because positional deviation can be relatively prevented as compared with a method in which the toner image formed on an endless belt is recorded to a recording paper sheet by pressing the toner image with roller.

Furthermore, the operation facility of the apparatus can be improved because the image display function and the hard copying function are respectively formed into separable units.

Further objects, features and advantages of the invention will be appear more fully from the following description.

DESCRIPTION OF THE PREFERRED EMBODIMENTS

Figure 1:
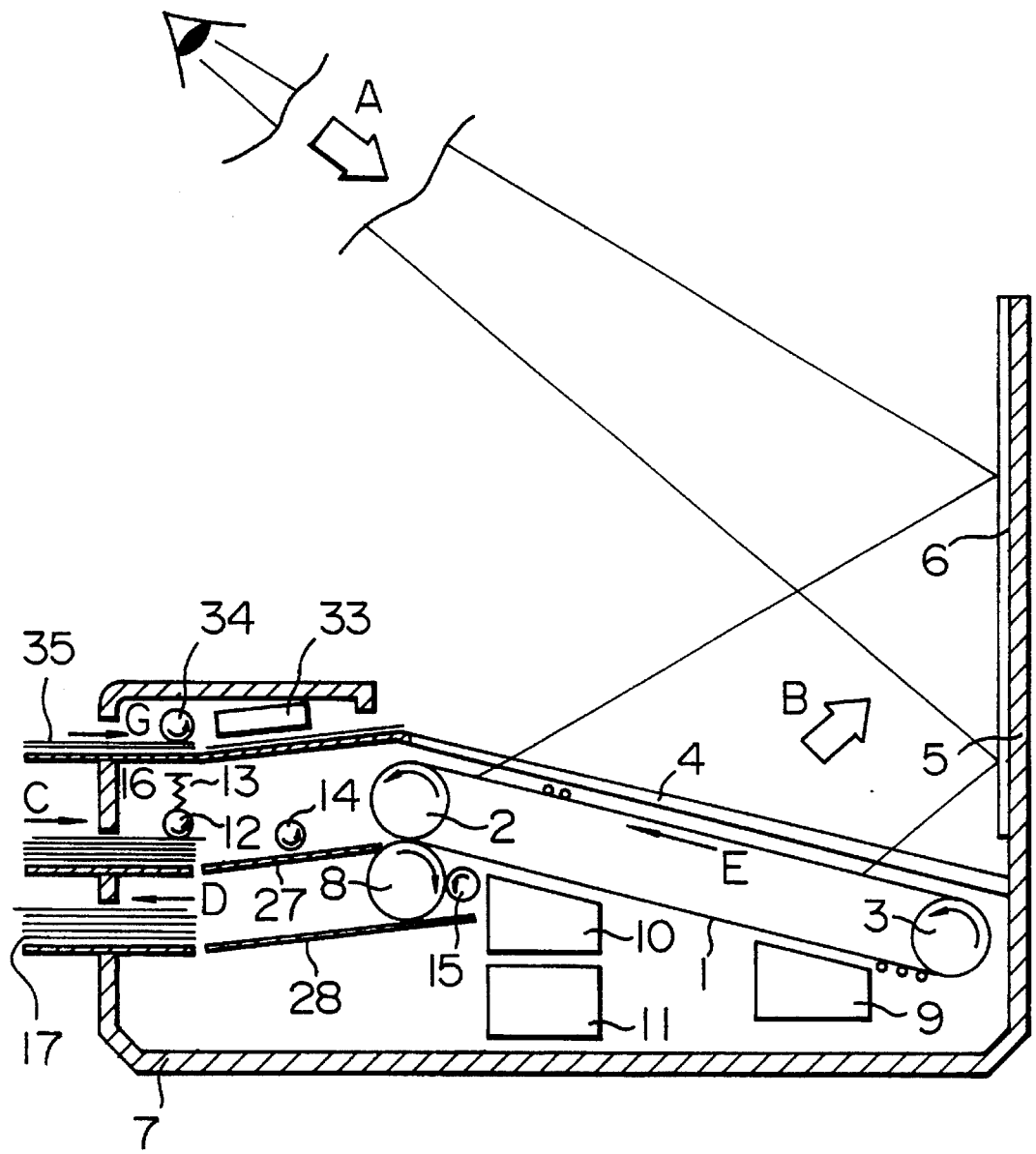
FIG. 1 is a vertical cross sectional view which illustrates a facsimile apparatus according to a first embodiment of the present invention.

Preferred embodiments of the present invention will now be described. FIG. 1 illustrates the structure of a facsimile apparatus according to a first embodiment of the present invention. First, the overall structure will now be described.

A recording electrode included in a development unit 9 is applied with voltage in accordance with received image information stored in a memory, so that a toner image is formed on an image recording medium. The recording medium 1 is supported rotatively in a direction designated by an arrow E by a drive roller 2 and a follower roller 3 each of which is driven by a motor (omitted from illustration).

Either of the rollers 2 and 3 may be driven by the motor, or both of them may be driven by the motor. The toner image formed on the image recording medium 1 by the development unit 9 is inverted upside down and laterally with respect to an image, which can be read. The toner image formed while being inverted upside down and laterally with respect to the image, which can be read, is projected in a direction designated by an arrow B through a screen 4 made of transparent plastic or the like. The toner image is projected on an image display surface composed of a cover 5 of the body of the facsimile apparatus and a mirror 6 integrally fastened to the cover 5 of the facsimile apparatus.

On the image display surface, the direction, in which the toner image on the image recording medium 1 is formed, is inverted upside down and laterally, resulting in the toner image to be displayed in a normal direction in which it can be readable by a person who is looking from a direction designated by an arrow A. Since the toner image is displayed on the image display surface while being scrolled upwards, received image information can be viewed sequentially.

The cover 5 and the mirror 6 serving the as the image display surface are, at an end portion thereof, fastened to a frame 7 of the body of the apparatus by a rotational structure (omitted from illustration), so that they can be translated between the illustrated position and a position adjacent to the screen 4. As a result, a direction of the image display surface, which is suitable for a person who is looking it from a direction designated by the arrow A, can be selected.

In order to arbitrarily select the image display position in the case where the toner image formed on the image recording medium 1 is actually displayed on the image display surface, the structure is arranged so as to enable the mirror 6 to be moved with respect to the cover 5. Furthermore, convex portions are formed partially or on the entire surface of the mirror 6, so that the toner image can be observed while being enlarged.

Recording paper sheets 16 stacked on a paper stack are separated from each other sequentially and then moved in a direction designated by an arrow C by a recording paper pick-up mechanism comprising a rubber roller 12 and a spring member 13.

The recording paper sheet 16 thus separated is moved along a guide 27 until it reaches a resist roller 14 at which the skew of the recording paper sheet 16 is corrected. Then, the recording paper sheet 16 is sent to a pressurizing portion comprising the drive roller 2 and a transferring roller 8, the recording paper sheet 16 being sent while being positionally synchronized with the toner image formed on the image recording medium 1 sent due to the rotation of the drive roller 2. In the pressurizing portion, the toner image formed on the image recording medium 1 is transferred onto the surface of the recording paper sheet due to the pressure applied thereto. If sufficiently high pressure is applied, the toner image can be fixed simultaneously with the transference.

As an alternative, the toner image can be transferred and fixed simultaneously while necessitating relatively low pressure when a heat source such as a halogen lamp is disposed in the transferring roller 8. Another structure may be employed in which the pressurizing portion comprising the drive roller 2 and the transferring roller 8 performs only the transference of the toner image on to the recording paper sheet and an individual fixing unit is provided. After the toner image formed on the image recording medium has been transferred and fixed as described above, the recording paper sheet is moved in a direction designated by an arrow D along a guide 28 by a discharge roller 15, and then it is discharged to a paper stack, so that recording paper sheets 17, on each of which the final image has been formed, are stacked.

A portion of the toner left on the image recording medium 1 is completely removed by a cleaning unit 10 since the toner is not transferred on to the recording paper sheet in the pressurizing portion. The pressurizing portion comprises the drive roller 2 and the transfer roller 8. Then, the image recording medium 1 stands by the next image forming operation. In the cleaning unit 10, an elastic blade made of urethane rubber or the like comes in contact with the image recording medium 1 while making a certain reverse angle with respect to the direction of the rotation of the image recording medium 1.

In the case where determinations are made that received information is not required and that a hard copy is not required as a result of the observation of the mirror 6 which is the image display surface, a selection switch (omitted from illustration) is operated so as not to rotate the rubber roller 12 and so as to separate the transferring roller 8 from the drive roller 2, so that the recording paper sheet 16 is not separated and moved. As a result of the operation, the toner image on the image recording medium 1 is not transferred onto the recording paper sheet 16, but it is directly sent to the cleaning unit 10 so as to be completely removed. Hence, the wasteful use of the recording paper sheet 16 can be prevented.

As an alternative, another structure having a cleaning unit provided for the transfer roller 8 thereof may be employed, wherein the toner image formed on the image recording medium 1 is transferred onto the transferring roller 8 in a state where the rubber roller 12 is not rotated so as not to separate and move the recording paper sheet 16, and then the toner image on the transferring roller 8 is cleaned up by the cleaning unit provided for the transferring roller 8.

The structure for transmitting an original document will now be described. An original document sheet 35 to be transmitted and stacked on the paper stack is one by one separated by a roller 34 so as to be moved in a direction designated by an arrow G. The original document sheet 35 separated and moved by the roller 34 are read by an original-document reading portion 33 comprising a reading sensor, so that image information is temporarily stored in a memory 11, the image information being then transmitted. If the original document to be transmitted is displayed on the image display surface and a confirmation is made before the transmission, erroneous transmission of the original document can be satisfactorily prevented.

Figure 2:
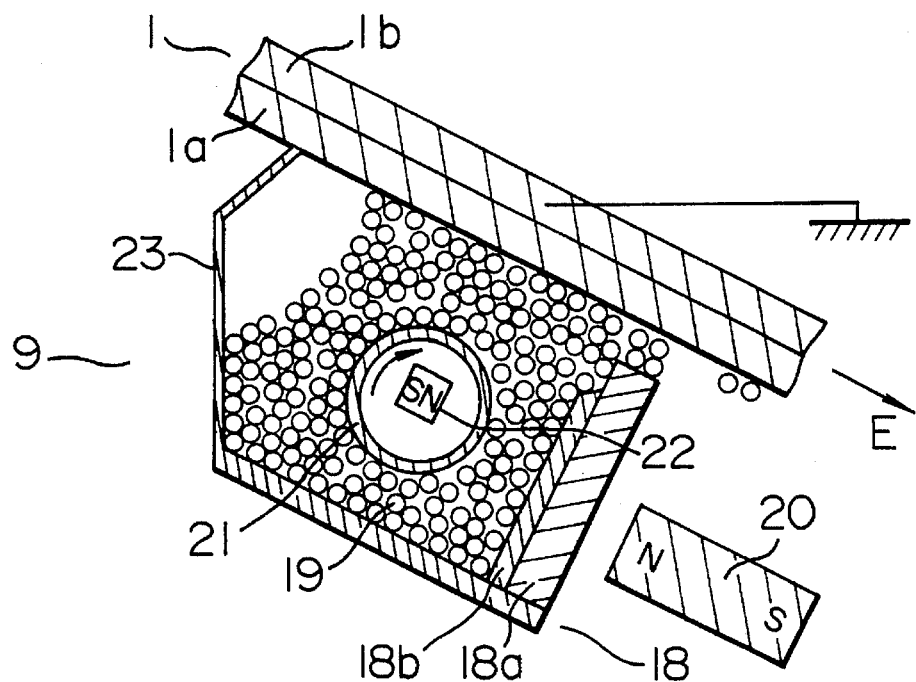
FIG. 2 illustrates a development unit according to the first embodiment.

Then, the image recording medium 1 and the development unit 9 will be described in detail with reference to FIG. 2. The image recording medium 1 comprises a conductive substrate layer 1b and a dielectric layer 1a formed to cover the conductive substrate layer 1b. The conductive substrate layer 1b is applied with a negative bias voltage of about −2 V.

The dielectric layer 1a is made of dielectric polymer material such as ethylene tetrafluoride resin, while the conductive substrate layer 1b is made of metal such as nickel formed on the dielectric layer 1a by vacuum evaporation. The conductive substrate layer 1b may be formed by, in an oxalic acid, anodic-oxidizing an aluminum alloy manufactured by a rolling work or the like and by forming the dielectric layer 1a on the surface thereof. Although the image recording medium 1 according to this embodiment is formed into an endless belt, the present invention is not limited to the aforesaid shape. It may be a plate-like shape or a cylindrical shape. In the case where the image recording medium is formed into the cylindrical shape, the mirror 6 is formed into a concave shape so that the image can easily be read.

A recording electrode 18 comprises a magnetic recording electrode needle 18a, which is fastened to the surface of a ceramic or a glass epoxy resin by a double-coated tape or the like, and an insulating cover 18b for covering the magnetic recording electrode needle 18a. A hopper 23 is filled with conductive magnetic toner 19. The leading portion of the recording electrode 18 is stably supplied with magnetic fluxes created by a stationary magnet 20 disposed in the lower stream in a direction, in which the image recording medium 1 moves, with respect to the recording electrode 18 and by another stationary magnet 22 placed in a non-magnetic cylindrical member 21 disposed in the upper stream in a direction, in which the image recording medium 1 moves, with respect to the recording electrode 18. Therefore, an electric conductive passage can be stably formed by the conductive magnetic toner between the recording electrode 18 and the image recording medium 1.

A voltage applying unit (omitted from illustration) applies a positive voltage of 30 V to the recording electrode 18 in accordance with the received image signal stored in the memory 11, so that the conductive magnetic toner present at the leading portion of the recording electrode 18 is directly supplied with a charge injected by the recording electrode 18 by injection and the conductive magnetic toner is positively charged. Since the conductive passage, through which the conductive magnetic toner 19 passes, is formed from the leading portion of the recording electrode 18 to the image recording medium 1, the conductive magnetic toner 19, which is positioned in contact with the dielectric layer 1a of the image recording medium 1 and which is positively charged, is able to form the toner image on the image recording medium 1 by Coulomb's force.

Since the magnetic fluxes are, at this time, stably supplied to the leading portion of the recording electrode 18 by using the stationary magnets 20 and 22, the synchronization can easily be made between the timing, at which the recording voltage is applied in accordance with received image information, and the timing at which the image recording medium 1 is moved. Therefore, a toner image having excellent resolution compared with the case where the flux is supplied from a rotary magnet is produced. The non-magnetic cylindrical member 21 acts to supply the conductive magnetic toner 19 to the leading portion of the recording electrode 18 by the rotational force thereof.

By using the development unit 9 having the stationary magnets 20 and 22 as described above, the magnetic fluxes can be stably supplied to the leading portion of the recording electrode 18.

According to this embodiment, the size of the apparatus can be reduced by forming, on the image recording medium 1, the toner image inverted upside down and laterally with respect to the normal direction in which the image can be directly and visually recognized and by displaying the image by using the mirror 6. Furthermore, an excellent final image with respect to the resolution of the toner image and the density can be obtained because the process, in which the toner image deteriorates undesirably, can be minimized due to a fact that a hard copy can be made only by directly transferring the toner image, formed on the image recording medium while being inverted, on to the recording paper sheet. Furthermore, the employed arrangement, in which the cover 5 and the mirror 6, which constitute the image display surface, can be opened/closed and in which the mirror 6 is able to move with respect to the cover 5, enables the cover to be closed if the image display function is not required. Furthermore, the image display position can easily be adjusted. Hence, the size of the apparatus can be reduced significantly and the operation facility to can be improved.

Furthermore, the arrangement so made that any electric means is not employed in the transferring process and the fixing process but only the mechanical and thermal means, that is, the pressure and heat, are employed enables a final image revealing an excellent resolution and high image density to be formed on a plain paper sheet while eliminating the need to use special paper sheet such as the electrostatic recording paper.

A second embodiment of a facsimile apparatus according to the present invention will now be described with reference to FIG. 3. In this embodiment, the image recording medium 1 is formed into a plate-like shape, and the image recording medium 1 is stationarily disposed so as to enable development units 9a and 9b to be moved. Furthermore, the development units 9a and 9b are respectively disposed on the upper surface and the lower surface of the image recording medium 1 so as to be movable in the direction within the plane of the image recording medium 1.

Figure 4:
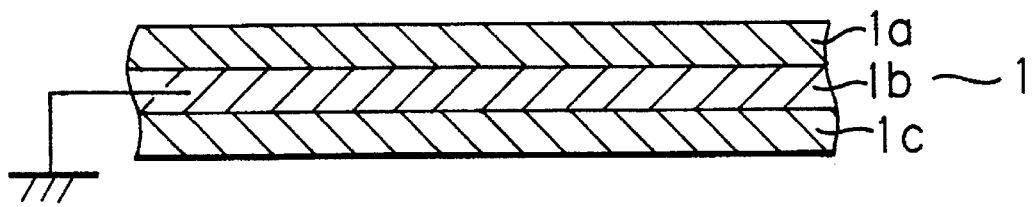
FIG. 4 is a cross sectional view which illustrates an image recording medium for use in the second embodiment.

The cross sectional structure of the image recording medium 1 according to this embodiment is formed as shown in FIG. 4 in such a manner that dielectric layers 1a and 1c cover the two sides of the conductive substrate layer 1b.

Figure 3:
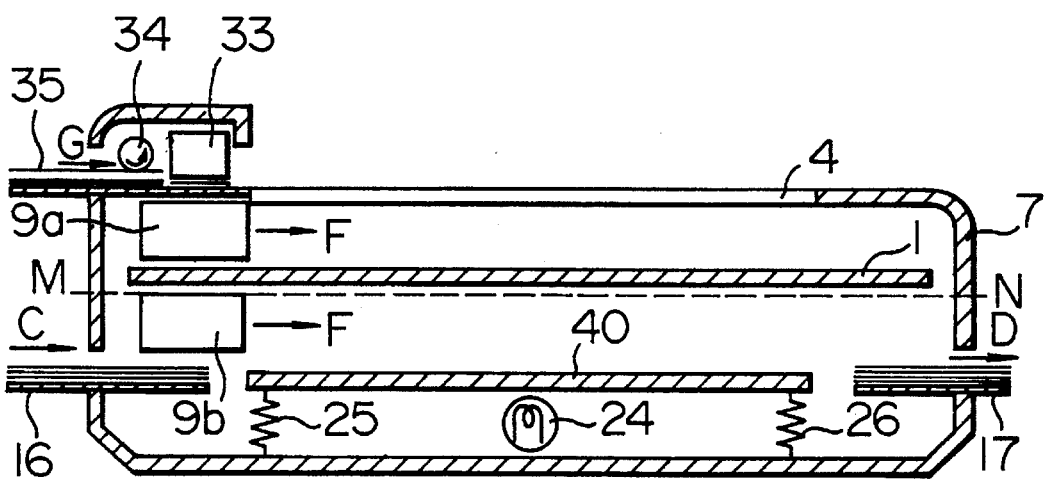
FIG. 3 is a vertical cross sectional view which illustrates a facsimile apparatus according to a second embodiment of the present invention.

Referring to FIG. 3, when the image display function is selected by a selection switch (omitted from illustration), the upper development unit 9a with respect to the image recording medium 1 is moved in a direction designated by an arrow F, so that recording voltage corresponding to received image information stored in the memory 11 (omitted from illustration) is applied to the recording electrode in the development unit 9a. Hence, a toner image in a normal readable direction is formed on the dielectric layer 1a on the image recording medium 1, so that the toner image is displayed via a transparent screen 4 made of, for example, plastic.

The upper development unit 9a with respect to the image recording medium 1 is stopped at the right end after it has moved from the left end position in FIG. 3 in the direction designated by the arrow F. If the toner image displayed on the image display surface is not required but the next received image signal is required to be displayed as the toner image, the development unit 9a stopped at the right end position in FIG. 3 is moved so as to return to the left end position, which is the original position, in a direction opposing the arrow F while canceling the application of the recording voltage to the recording electrode 18.

At this time, the conductive magnetic toner enclosed in the toner hopper of the development unit 9a deletes the toner image displayed on the image recording medium 1 and eliminates the surface potential on the image recording medium 1. That is, the development unit 9a also serves as the function of the cleaning unit 10.

In the case where the hard copying function is selected, the lower development unit 9b with respect to the image recording medium 1 is moved in the direction designated by the arrow F shown in FIG. 3, so that voltage corresponding to the received image information stored in the memory is applied to the recording electrode 18 in the development unit 9b. Hence, an inverted toner image with respect to the toner image formed on the dielectric layer 1a is formed on the dielectric layer 1c on the image recording medium 1.

The recording paper sheet 16 stacked on the paper stack is picked up by a separation and moving mechanism arranged similarly to the structure according to the first embodiment, and they are moved to the position above the transferring and fixing unit 40, the position being synchronized with the position of the toner image formed on the lower dielectric layer 1c of the image recording medium 1.

The transferring and fixing unit 40 is abutted against the toner image on the image recording medium 1 by spring mechanisms 25 and 26 in a state where the recording paper sheet 16 is set, so that the toner image is transferred and fixed to the recording paper sheet. Although the urging force from the spring mechanisms 25 and 26 may be enlarged so as to transfer and fix the toner image by only the pressure, another structure may be employed which has a heating means 24 such as a halogen lamp disposed below the transferring and fixing unit 40 and arranged to heat the transferring and fixing unit 40 so as to melt the toner image formed on the image recording medium 1, resulting in the pressure required to fix the toner image to be lowered. As an alternative, another structure may be employed in which the pressure required by the fixing unit and another fixing unit may be employed.

The structure of the original document transmitting portion is arranged similarly to that according to the embodiment described with reference to FIG. 1, wherein the original document sheet 35 to be transmitted is stacked on the paper stack so as to be separated individually by the roller 34, resulting in that the original document sheet 35 to be transmitted is moved in a direction designated by an arrow G. The original document sheet 35, which has been separated and moved by the roller 34, is read by the original-document reading portion 33 comprising the reading sensor so as to be temporarily stored in the memory as image information before the image information is transmitted.

Figure 5:
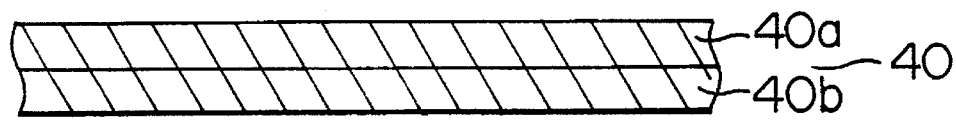
FIG. 5 is a cross sectional view which illustrates a transferring and fixing unit for use in the second embodiment.

FIG. 5 illustrates the structure of the transferring and fixing unit 40. The transferring and fixing unit 40 comprises a flat plate 40b made of metal such as nickel having a high heat conductivity, and a surface layer 40a made of a polymer material such as an ethylene tetrafluoride resin for the purpose of easily separating the conductive magnetic toner.

In this embodiment, switching between the direction in which the toner image is displayed in the image display function mode and the direction in which the toner image is displayed in the hard copying function mode is performed by changing over received image information in the memory by an electric signal processing method.

In the aforesaid electric signal method, received image information for one line that is stored in the memory is transferred to a line buffer, and parallel image information received by the line buffer is shifted in a shift register so as to make image information to be serial data, which is applied to the recording electrode of the development unit as the recording voltage.

When the inversion of received image information is desired, the direction in which the image information is shifted in the shift register is inverted to that in the aforesaid case so as to apply output serial data to the recording electrode. Therefore, the shift register must be a bidirectional shift register. Although the process for switching the image information by the electric signal processing method causes the size of the memory to be undesirably enlarged, the size of the mechanical structure can be reduced.

If a determination is, as a result of the confirmation of the first image of a batch of received image information, made that the hard copy of the batch of received image information is required, the display of the image of the batch of received image information need not be continued. Therefore, no readable toner image is formed on the dielectric layer 1a of the image recording medium 1, but the toner image is formed only on the dielectric layer 1c so as to make the hard copy.

The facsimile apparatus according to this embodiment has the image display function disposed in the upper portion thereof and the hard copying function disposed in the lower portion thereof, the image display and hard copying functions being respectively formed into individual units so that they can be separated from each other at a position designated by a dashed line which connects points M and N shown in FIG. 3, and they can be individually freely mounted and removed.

When the toner image, to be made into the hard copy, formed on the two sides of the image recording medium is recorded, a structure may be employed in which the heating means 24 is provided for the metal means 40b of the transferring and fixing unit 40, and the recording paper sheet is abutted against the toner image so as to transfer and fix the toner image to it by the heating means 24 while inhibiting the movement of the recording paper sheet. In this case, the positional deviation between the toner image and the recording paper sheet can be prevented, resulting in a high resolution image to be obtained as compared with the method in which the toner image is recorded on to the recorded paper sheet by abutting the roller against the toner image formed on the endless belt.

Furthermore, the structure in which the functions are formed into individual units will enable an apparatus, the size of which can be significantly reduced and which can easily be operated, can be realized. If only the image display function is required for example, only the upper unit can be used.

Since a high resolution toner image is formed on the image recording medium 1 by using the development units 9a and 9b and since no intermediate transferring medium is used, the process, in which the quality of the toner image deteriorates, can be minimized, resulting in an excellent image to be obtained even if the toner image is transferred and fixed to the surface of the recording paper sheet 16. Therefore, a high resolution final image can be obtained even if a recording paper sheet having an ordinary size such as A4 or B4 size is used.

Figure 6:
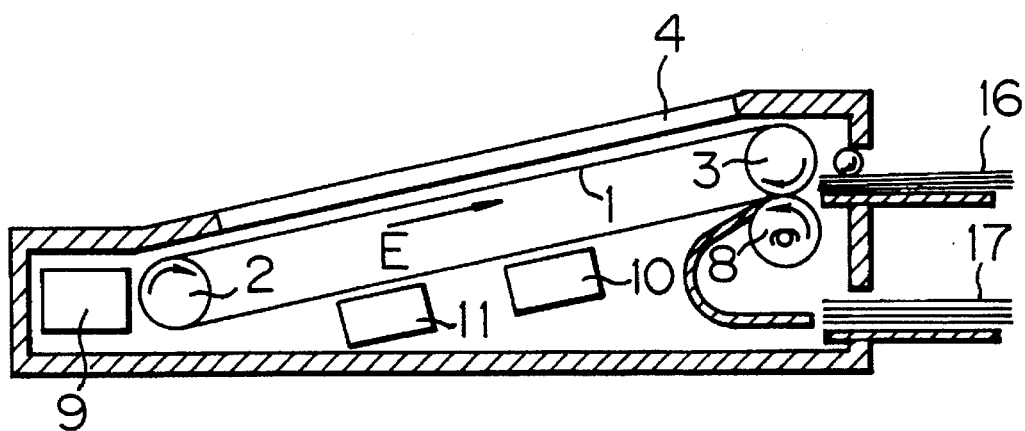
FIG. 6 is a vertical cross sectional view which illustrates a facsimile apparatus according to a third embodiment of the present invention.

A third embodiment of a facsimile apparatus according to the present invention will now be described with reference to FIG. 6. The third embodiment shown in FIG. 6 is arranged so that the image display function and the hard copying function are switched by an electric signal processing method similarly to the second embodiment described with reference to FIG. 3 in place of the structure according to the first embodiment in which the image display function and the hard copying function are mechanically switched. In the case where the image display function has been selected by using the selection switch, a toner image in the readable normal direction on the image recording medium 1 in accordance with received image information stored in the memory 11 before it is displayed via the screen made of plastic or the like. If the toner image displayed by the image display function is required, the hard copying function is selected by the selection switch.

As a result of the selection thus performed, the toner image formed on the image recording medium 1 is temporarily completely deleted by the cleaning unit 10, and the image information signal is inverted horizontally with respect to the normal visible direction in the memory 11, and then the development unit 9 forms a toner image, which has been inverted horizontally, that is, which is symmetric to the normal direction image, on the image recording medium 1. The method of electrically inverting the image information signal in the memory 11 is arranged to be the same as that according to the second embodiment. The toner image, formed while being inverted horizontally with respect to the readable direction, is permanently fixed on the recording paper sheet due to the pressure and the heat in the pressurizing portion comprising the roller 3 and the transferring and fixing roller 8. The method of moving the recording paper sheet is made to be the same as that according to the aforesaid embodiments. Although the structure of the original-document transmitting portion is omitted from illustration, the structure according to the first or the second embodiment is described with reference to FIG. 1 or FIG. 3.

According to this embodiment, the size of the body of the apparatus can be minimized among the other embodiments.

Figure 7:
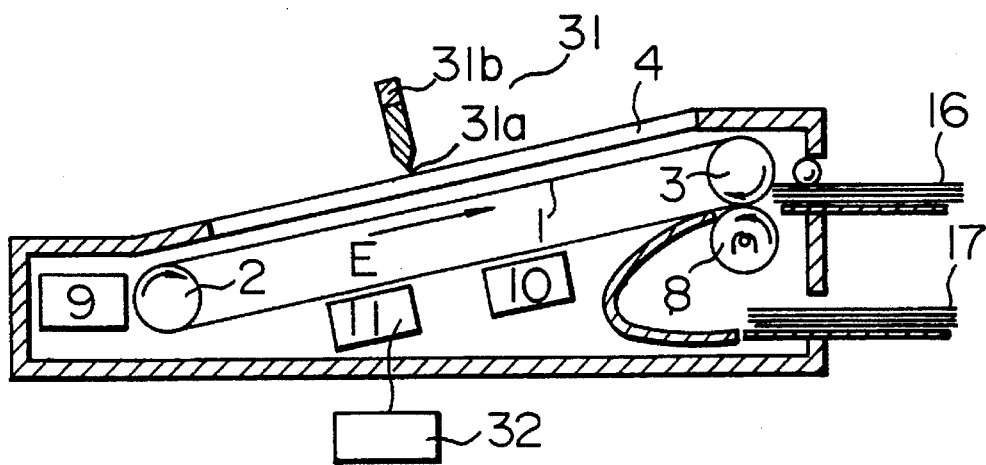
FIG. 7 illustrates an example of use of the facsimile apparatus.

FIG. 7 illustrates an example of use of the facsimile apparatus according to the present invention. If certain information is added to the hard copy or is transmitted when the received image or the image to be transmitted is displayed on the screen, a pen 31a is used to add required information on to the screen 4. The image information reading device 32 reads information displayed on the screen 4 and causes it to be temporarily stored in the memory 11. Hence, information formed by synthesizing image information present per se and the added information can be transmitted to the other side of the line, or hard copy of it can be made.

Although the image information reading device may be included in the body of the facsimile apparatus, or it may be formed into a unit so as to be fastened to the outer surface of the body of the apparatus, it is preferable to form it into a unit because the size of the apparatus can be reduced and the operation facility can be improved due to the fact that scanning can be performed by touching the screen 4 with the image information reading device 32.

In the case where transmission is made while deleting a portion of the toner image displayed on the image display surface constituted by the screen 4 made of the transparent plastic or the like, or in the case where a hard copy is made, unnecessary image information is deleted by a magnetized eraser 31b which utilizes the characteristics that the toner is magnetic material.

Furthermore, the pen 31a for additionally writing an image and the eraser 31b for deleting the toner image are included in one frame 31 so as to be an integral writing tool, causing the operation facility to be improved. Since no electric means is employed in the facsimile apparatus according to this embodiment to transfer and fix the toner image, it is freed from generation of ozone and generation of paper dust if only the image display function is utilized, the facsimile apparatus according to this embodiment can be utilized as OA equipment for use in a, for example clean room which must be protected from dust.

Figure 8:
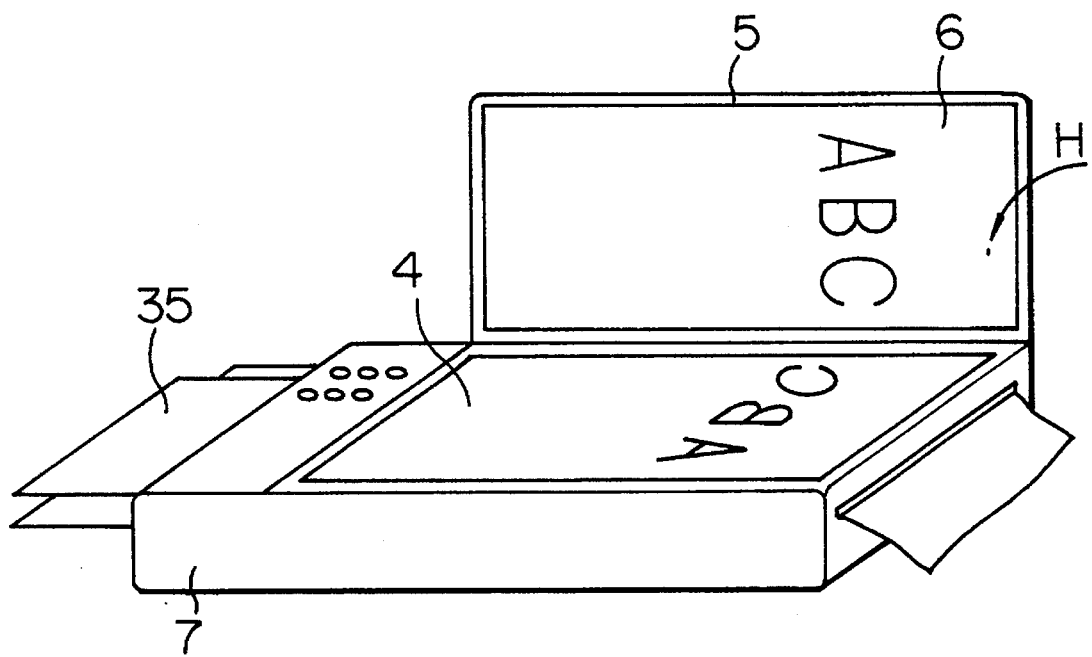
FIG. 8 is a perspective view which illustrates a facsimile apparatus according to a fourth embodiment of the present invention.

A fourth embodiment of a facsimile apparatus according to the present invention will now be described with reference to FIG. 8. The facsimile apparatus shown in FIG. 8 is different from the structures according to the aforesaid embodiments in that the mirror 6 forming the image display surface is disposed so as to horizontally display the toner image formed on the image recording medium 1.

The image display surface comprising the mirror 6 is enabled to rotate in a direction designated by an arrow H. As a result of the aforesaid structure, a person who transmits an original document is able to operate the facsimile apparatus while standing parallel to the direction in which the original document is sent, resulting in the operation facility to be improved.

Since the present invention is structured and operated as described above and has the image display function and the hard copying function, the waste of the recording paper sheet can be prevented. Furthermore, the size of the apparatus can be reduced because the display direction of image information is switched by inverting it while using the mirror, or by inverting it in the electric signal processing manner. Furthermore, the apparatus, in which the magnetic flux is stably supplied to the leading portion of the recording electrode by using the stationary magnet will enable a high resolution toner image to be formed on the image recording medium. In addition, the final image exhibiting excellent resolution can be formed on the recording paper sheet because the toner image formed on the image recording medium is directly transferred and fixed on to the recording paper sheet. Furthermore, the apparatus can be reduced and the operation facility of it can be improved because the image display function and the hard copying function are respectively formed into the individual units.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A facsimile apparatus, comprising:

storage means for storing either of original-document image information to be transmitted and received original-document image information;

an image recording medium, comprising a continuous belt, for forming a toner image which corresponds to an image signal in image information stored in said storage means;

image recording means for directly forming the toner image onto said image recording medium;

a flat display portion provided in said image recording medium;

image signal inversion means for electrically inverting the image signal stored in said image information storage means causing the toner image formed on said image recording medium to be oriented in a direction inverted from a readable direction;

a mirror for reading the toner image formed on said display portion of said image recording medium from the image signal inverted by said image signal inversion means;

selection means for determining whether or not it is necessary to record image information discriminated from the toner image displayed on said mirror; and hard copying means for transferring and fixing the toner image formed on said image recording medium onto a recording sheet of paper.

2. A facsimile apparatus according to claim 1, wherein either of a portion or the entire surface of said mirror surface is formed into a convex surface.

3. A facsimile apparatus according to claim 1, wherein said image recording medium comprises an endless belt formed by applying a dielectric material, which includes a dielectric polymer material, to the surface of a metal member.

* * * * *